US010857950B2

(12) United States Patent
    Cox

(10) Patent No.: US 10,857,950 B2
(45) Date of Patent: *Dec. 8, 2020

(54) TAILGATE BIKE STRAP

(71) Applicant: William J. Cox, Aptos, CA (US)

(72) Inventor: William J. Cox, Aptos, CA (US)

(73) Assignee: William Cox, Aptos, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/505,498

(22) Filed: Jul. 8, 2019

(65) Prior Publication Data

US 2019/0337464 A1    Nov. 7, 2019

Related U.S. Application Data

(63) Continuation-in-part of application No. 15/350,711, filed on Nov. 14, 2016, now Pat. No. 10,343,617.

(60) Provisional application No. 62/313,142, filed on Mar. 25, 2016.

(51) Int. Cl.
    *B60R 9/00*  (2006.01)
    *B60R 9/10*  (2006.01)
    *B60R 9/06*  (2006.01)

(52) U.S. Cl.
    CPC . *B60R 9/10* (2013.01); *B60R 9/06* (2013.01)

(58) Field of Classification Search
    CPC ................................... B60R 9/06; B60R 9/10
    USPC ................................................. 224/403, 924
    See application file for complete search history.

(56) References Cited

U.S. PATENT DOCUMENTS

| 5,014,890 | A  | * | 5/1991  | Perry ........................ | B60R 9/10 |
|           |    |   |         |                              | 224/324   |
| 5,037,019 | A  | * | 8/1991  | Sokn ........................ | B60R 9/00 |
|           |    |   |         |                              | 224/403   |
| 6,454,149 | B1 | * | 9/2002  | Moore ....................... | B60P 3/40 |
|           |    |   |         |                              | 224/309   |
| 7,913,885 | B2 | * | 3/2011  | Long ....................... | B60R 9/0423 |
|           |    |   |         |                              | 182/127   |
| 8,985,415 | B2 | * | 3/2015  | Heininger ................. | B60R 9/10 |
|           |    |   |         |                              | 224/403   |
| 9,321,392 | B1 | * | 4/2016  | LeBrun .................. | B60P 7/0869 |
| 2004/0262347 | A1 | * | 12/2004 | Green ....................... | B60P 3/07 |
|           |    |   |         |                              | 224/403   |
| 2012/0118928 | A1 | * | 5/2012  | Laws ....................... | B60R 9/06 |
|           |    |   |         |                              | 224/403   |

* cited by examiner

*Primary Examiner* — Peter N Helvey
(74) *Attorney, Agent, or Firm* — Lumen Patent Firm

(57) ABSTRACT

A bicycle mounting device is provided that includes a base strap having a base strap first end and a base strap second end, where the base strap first end is detachably connected to the base strap second end by an adjustable length connector to form a loop-shape base strap, an upper connection element, where the upper connection element is dimensioned to detachably connect a bicycle frame down tube to the base strap, and at least one lower connection element, where the at least one lower connection element is disposed below the upper connection element, where the at least one lower connection element is dimensioned to detachably connect a bicycle fork arm tube to the base strap.

10 Claims, 8 Drawing Sheets

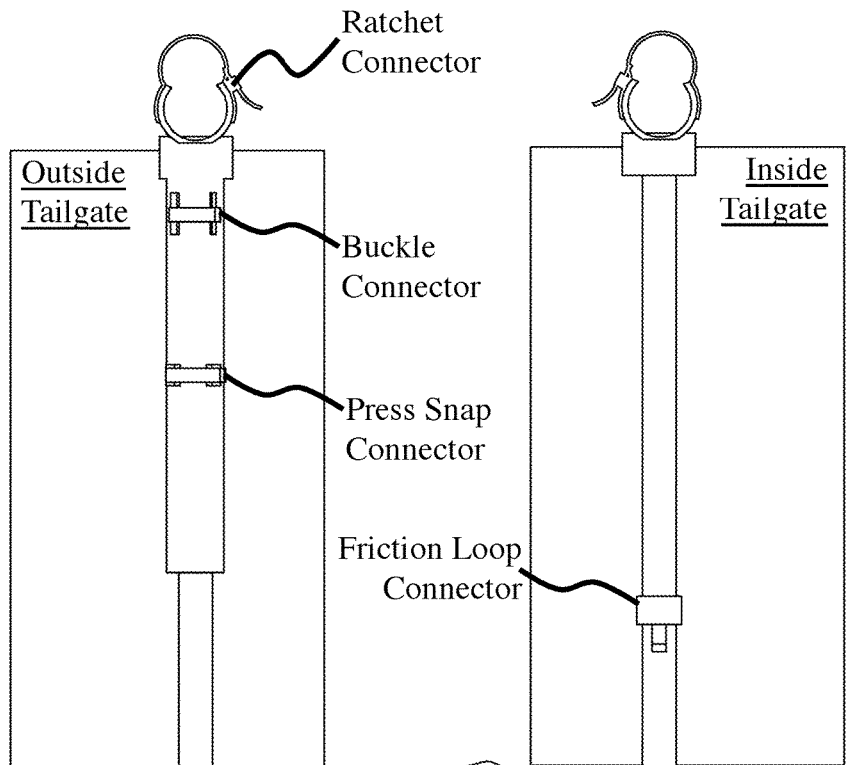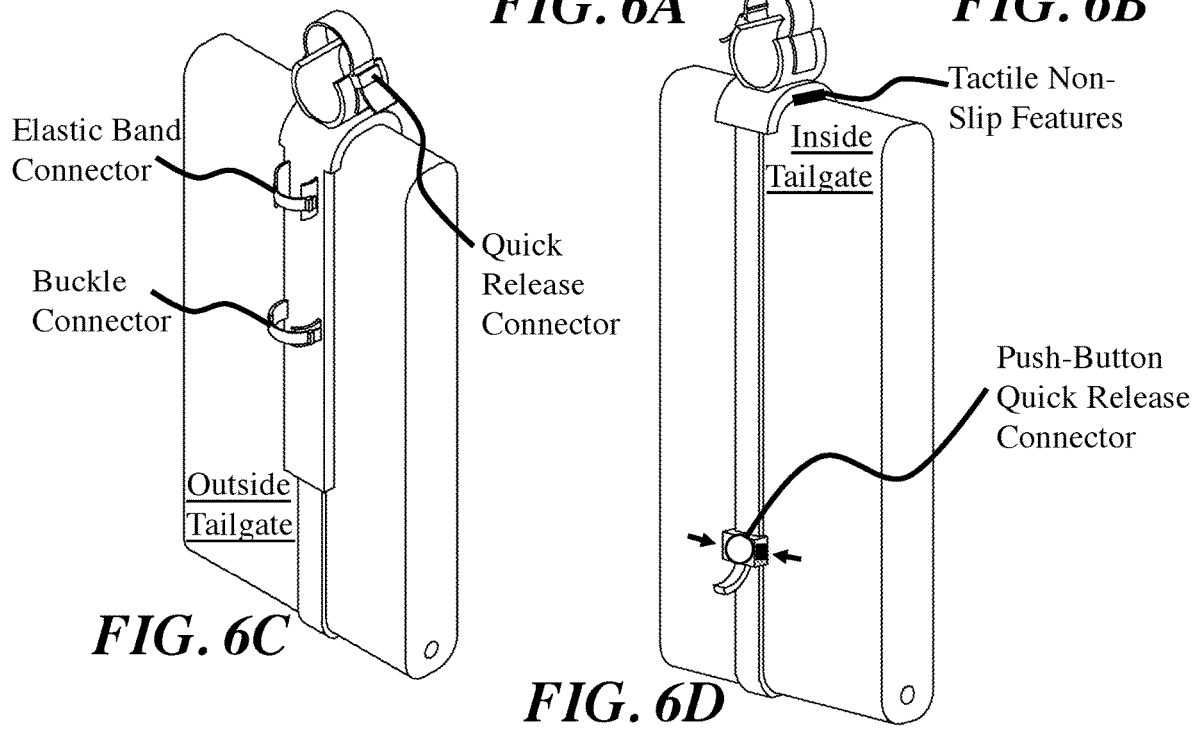
FIG. 6A  FIG. 6B  FIG. 6C  FIG. 6D

TAILGATE BIKE STRAP

CROSS-REFERENCE TO RELATED APPLICATIONS

This application is a continuation-in-part of U.S. patent application Ser. No. 15/350,711 filed Nov. 14, 2016, which is incorporated herein by reference. U.S. patent application Ser. No. 15/350,711 filed Nov. 14, 2016 claims the benefit of Provisional application 62/313,142 filed Mar. 25, 2016, which is incorporated herein by reference.

FIELD OF THE INVENTION

The current invention relates to transporting bicycles. More specifically, the invention relates to a device for mounting a bicycle to a truck tailgate.

BACKGROUND OF THE INVENTION

Transporting a bicycle safely in a pickup truck is a common problem. Current attempts to address this issue include draping a blanket over the tailgate, or attaching an external carrying rack to the tailgate, within the truck bed, or on the truck roof. What is needed is a simple, no-scratch bicycle mounting device that conveniently attaches to a truck tailgate for securely holding a bicycle.

SUMMARY OF THE INVENTION

To address the needs in the art, a bicycle mounting device is provided that includes a base strap having a base strap first end and a base strap second end, where the base strap first end is detachably connected to the base strap second end by an adjustable length connector to form a loop-shape base strap, an upper connection element, where the upper connection element is dimensioned to detachably connect a bicycle frame down tube to the base strap, and at least one lower connection element, where the at least one lower connection element is disposed below the upper connection element, where the at least one lower connection element is dimensioned to detachably connect a bicycle fork arm tube to the base strap.

In one aspect of the invention, the base strap further includes a flexible protective core along the base strap, where the flexible protective core and the base strap are dimensioned to form a security strap, where the security strap includes a flexible splice-resistant material, and a first locking element disposed on a first end of the security strap, and a second locking element disposed on a second end of the security strap, where the first locking element is dimensioned to engage the second locking element to lock the security strap in the loop-shape. In one aspect, the upper connection element includes a splice-resistant material and a locking element that is dimensioned to lock the bicycle mounting device about the bicycle frame down tube.

According to another aspect of the invention, the base strap securing element, the top connection element and the at least one lower connection element is selected from the group consisting of hook and pile, male to female connectors, buckle, friction loop, button and hole, press snap, ratchet connection, boa dial, quick release, a magnetic lock, a C-shape socket, mechanical hinged push button release, and a push button release. In one aspect, the C-shape socket further includes a closing element configured to detachably span across an open end of the C-shape socket to selectively close the C-shape socket.

According to another aspect of the invention, the top securing element includes a top C-shape socket, where the top C-shape socket comprises a top closing element configured to detachably span across an open end of the top C-shape socket to selectively close the top C-shape socket.

In another aspect of the invention, a bottom surface of the base strap comprises a tactile polymer feature disposed to limit slipping between the bicycle mounting device and a truck tailgate.

In a further aspect of the invention, the at least one lower connection element is moveably attached to the base strap, where one or more the moveably attached lower connection elements are configured in a daisy chain along the base strap.

In yet another aspect of the invention, the base strap includes a padded bottom surface, a flexible protective core, and a durable fabric top surface.

According to one aspect of the invention, the at least one lower connection element is slidably connected along the base strap.

BRIEF DESCRIPTION OF THE DRAWINGS

FIGS. 6A-6D show exemplary connector configurations for the bicycle mounting device attached to a cut-away view of the tailgate, according to various embodiments of the current invention.

FIG. 7D shows a securing element sizing shim.

DETAILED DESCRIPTION

The current invention is a tailgate tie-down kit for transporting mountain bicycles, road bicycles or any other type of bicycle, where the bicycle is secured over the rear of a pickup truck tailgate for transport. According to one embodiment, the invention includes a flexible strapping system that uses materials that are resistant to the weather, sun, heat or other outdoor conditions. The device includes supple cushioning that protects the bicycle and tailgate from scratches, dents, deformation or the like.

Figures 1A, 1B:
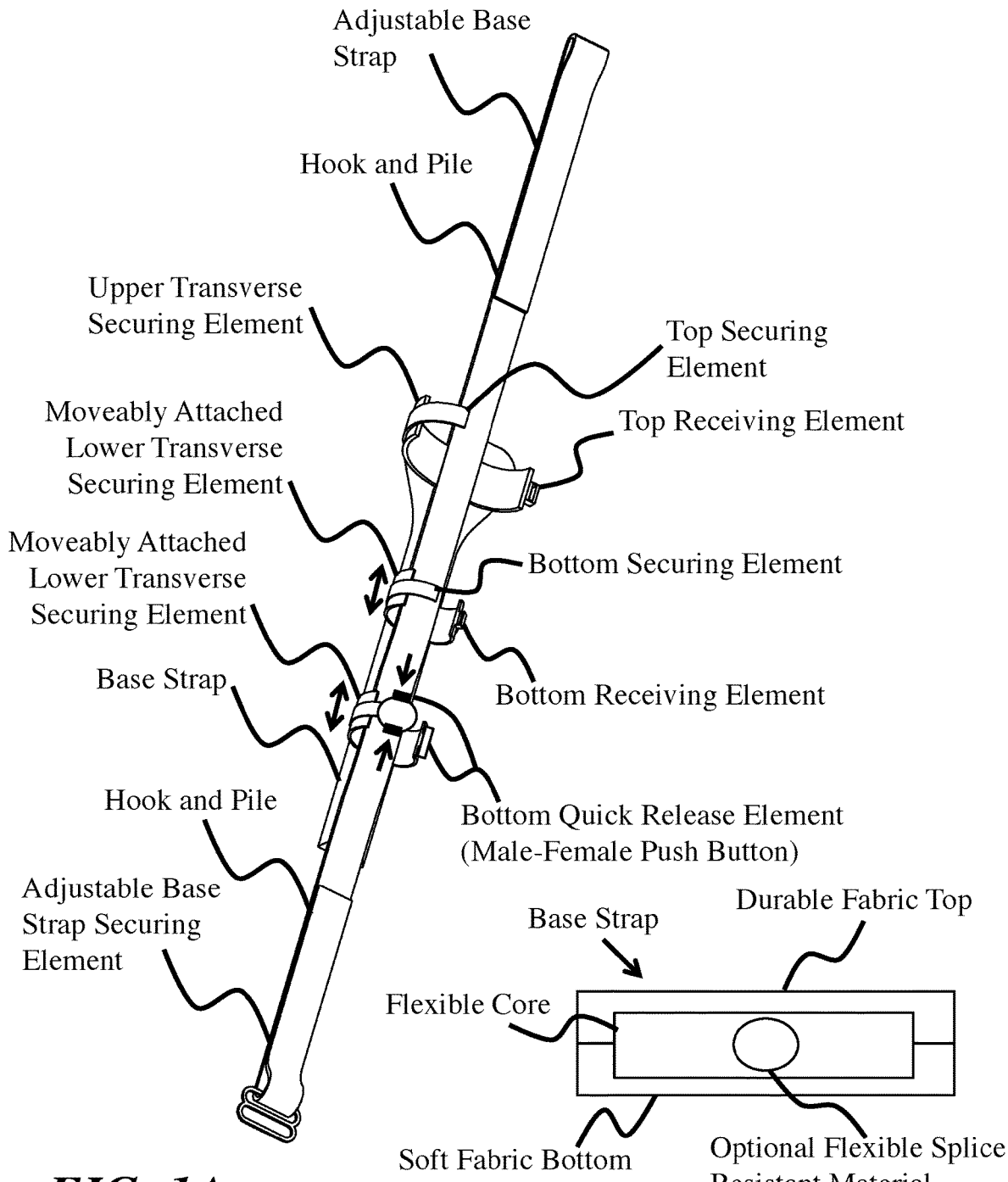
FIG. 1A shows a perspective view of the bicycle mounting device, according to one embodiment of the invention.
FIG. 1B shows a cross section of the base strap having the flexible core with an optional splice-resistant material, according to one embodiment of the invention.

Turning now to the figures, FIGS. 1A-1B show one embodiment of the bicycle mounting device that includes a base strap having a soft fabric bottom surface, a flexible protective core, and a durable fabric top surface, where also shown in FIG. 1B is an optional flexible splice-resistant material within the flexible protective core. The base strap has a proximal end and a distal end with a length that spans from a top region of a truck tailgate to a bottom region of the truck tailgate. Further, the base strap includes an adjustable length base strap securing element at one end and an adjustable length base strap ant the other end, where these aspects are configured to secure the base strap to the truck tailgate. Attached to the base strap is an upper transverse strap that is transverse to the base strap, where the upper transverse strap is disposed proximal to the base strap proximal end with a length that is capable of wrapping about a bicycle frame tube (see FIGS. 2-4). Additionally, the upper transverse strap includes a top strap fastening element that is configured to secure the upper transverse strap about the bicycle frame tube. As shown in the figures, the upper transverse strap is wrapped about the bicycle frame down tube, but it is understood that the invention can be configured to secure other frame tubes. Further shown is at least one lower transverse strap that is transverse to the base strap and is disposed below the upper transverse strap, where in the examples shown there are two lower transverse straps. As shown, each transverse strap has a length that is capable of wrapping about a bicycle fork arm and includes a lower strap fastening element, where the lower strap fastening element is configured to secure the at least one lower transverse strap about the bicycle fork arm (see FIG. 4).

Figure 5:
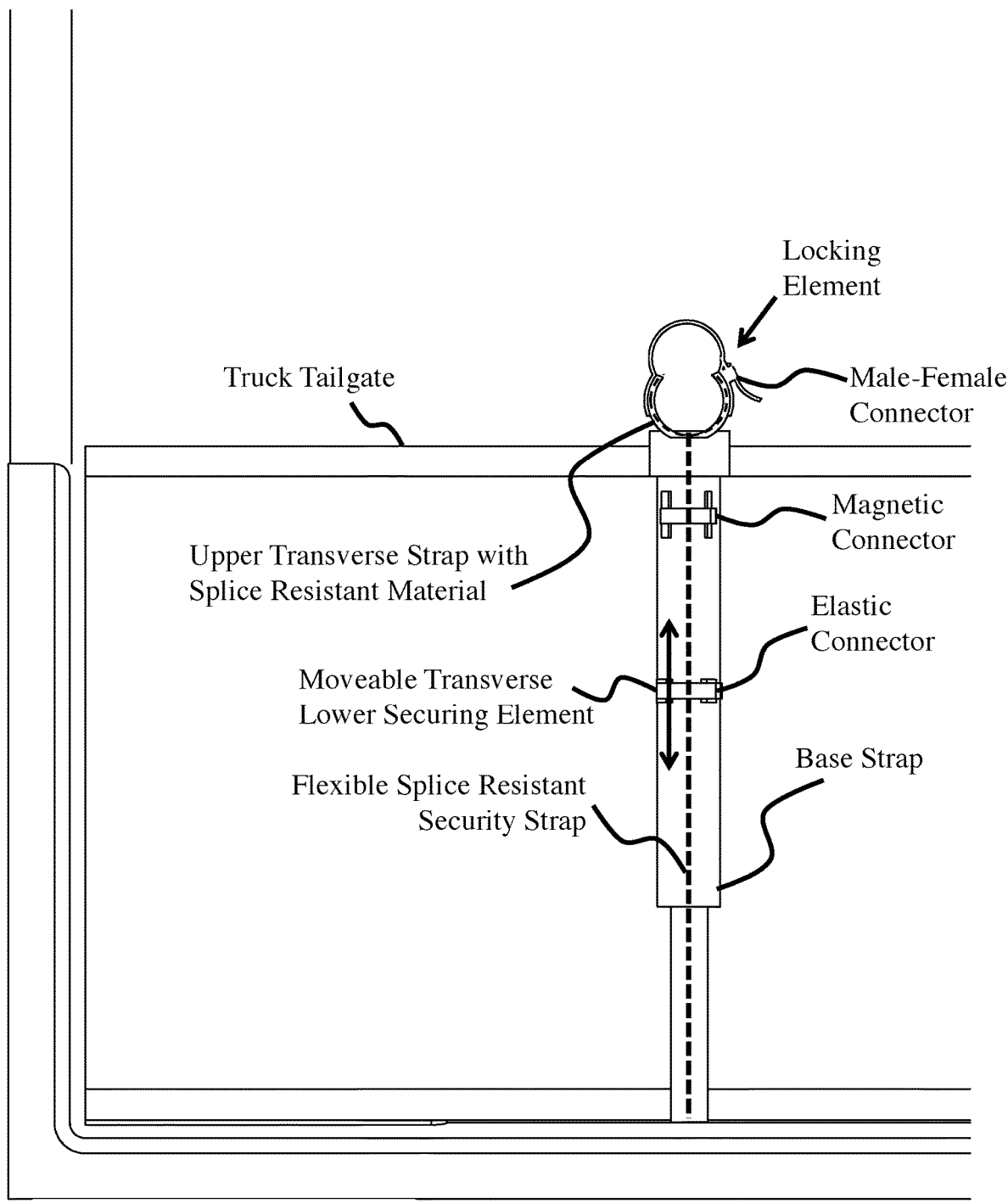
FIG. 5 shows a planar view from the rear of a truck having the bicycle mounting device installed on a truck tailgate, where the base strap includes a flexible splice-resistant material, according to one embodiment of the invention.

FIG. 1A and FIG. 5 show at least one lower transverse strap is moveably attached to the base strap, where one or more moveably attached lower transverse straps are configured in a daisy chain along said base strap, according to one aspect of the invention.

The durable fabric top surface can include any suitable material that is resistant to abrasion, sun and weather, yet does induce scratches to the bicycle or truck tailgate. The double-sided fabric is configured to distribute shear force within the base strap to avoid shear forces and allows the bicycle to be protected from the tailgate.

As shown in FIG. 1B and FIG. 5, the flexible protective core includes a security strap having a flexible splice-resistant material that is disposed to wrap about the truck tailgate, a locking element configured to lock the bicycle mounting device about the truck tailgate, and a bicycle lock loop, where the bicycle lock loop is configured to receive a bicycle lock that is disposed to lock a bicycle to the tailgate. FIG. 5 shows the upper transverse strap having a transverse security strap that includes a flexible splice-resistant material that is capable of wrapping about the bicycle frame tube, and a locking element configured to lock the bicycle mounting device about the bicycle frame tube.

Figure 4:
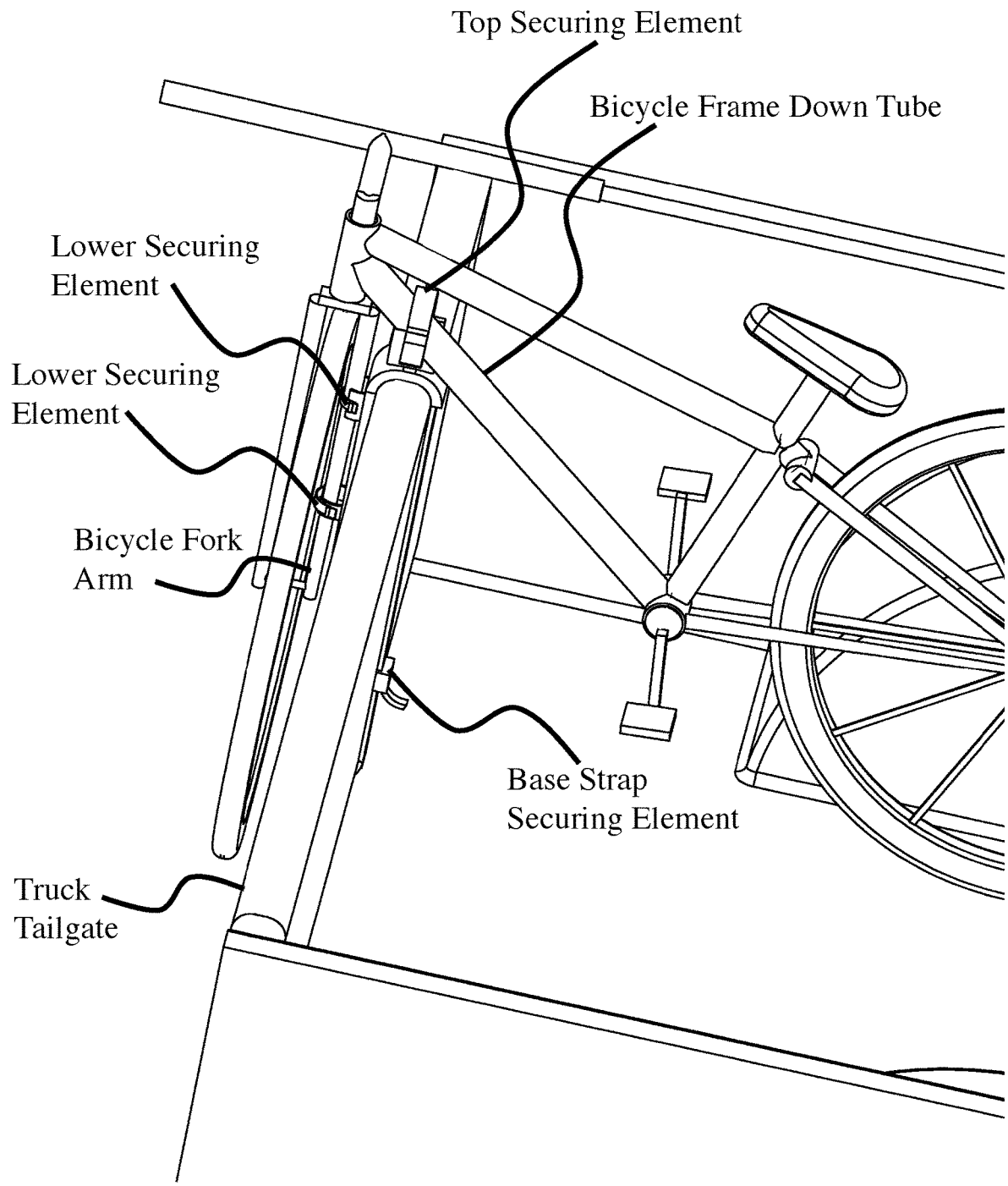
FIG. 4 shows a perspective view of the bicycle mounting device installed on a truck tailgate and having a bicycle mounted there on, according to one embodiment of the invention.

FIG. 4 shows tow lower transverse straps that include a first lower transverse strap configured to wrap about an upper region of the fork arm, and a second lower transverse strap configured to wrap about a lower region of the fork arm.

As presented in the FIG. 1A, FIG. 4, FIG. 5, and FIGS. 6A-6D, the base strap securing element, the top strap fastening element and the lower strap fastening element can include connectors such as hook and pile, male to female, buckle, friction loop, button and hole, press snap, ratchet, boa dial, and quick release, where it is understood that these exemplary fastening elements can be configured for either the top transverse strap, the bottom transverse strap(s) and the base strap.

As shown in FIG. 6D, the soft fabric bottom surface includes a tactile polymer feature disposed to limit slipping between the bicycle mounting device and a truck tailgate.

Figure 2:
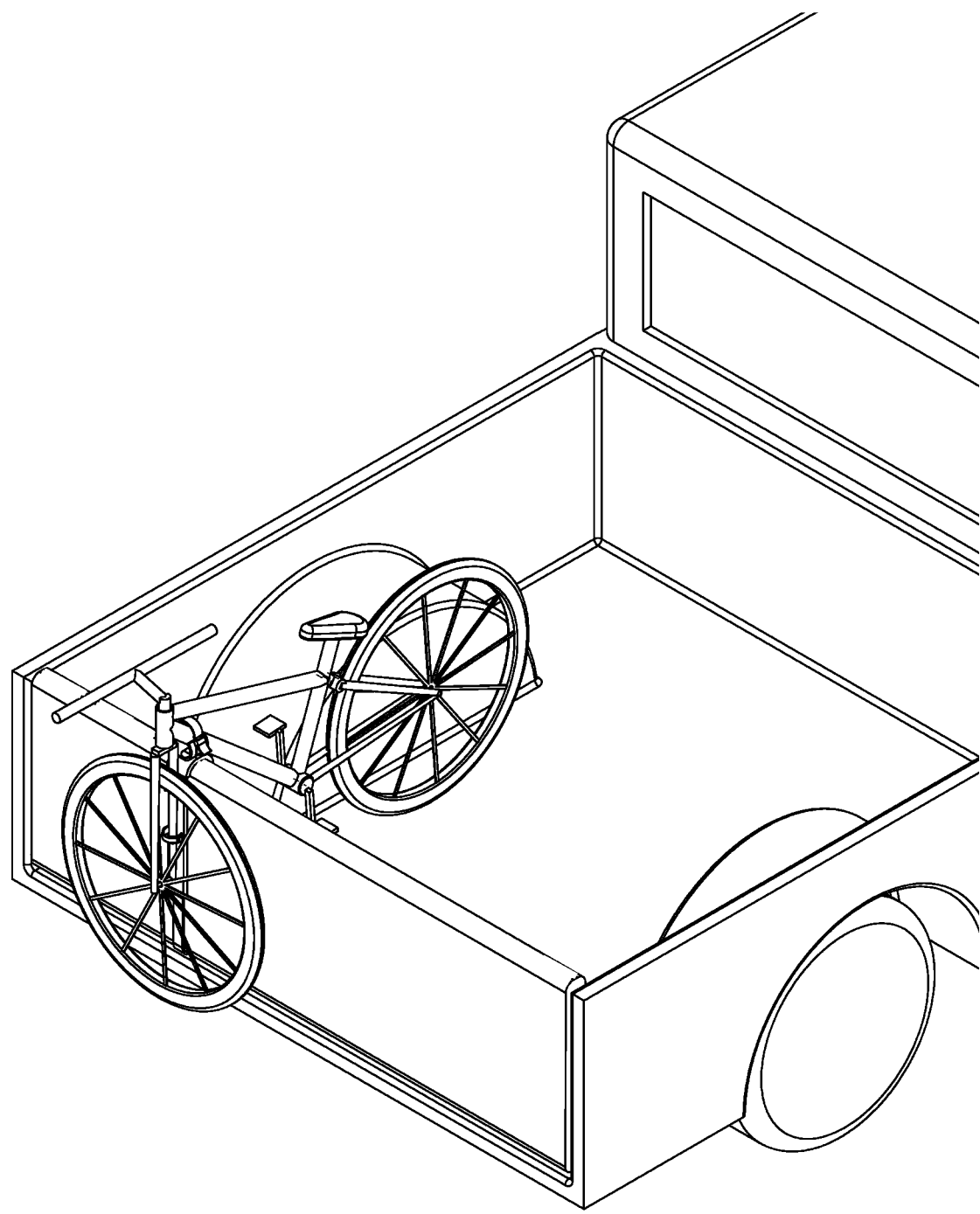
FIG. 2 shows a perspective view of the bicycle mounting device installed on a truck tailgate and having a bicycle mounted there on, according to one embodiment of the invention.
Figure 3:
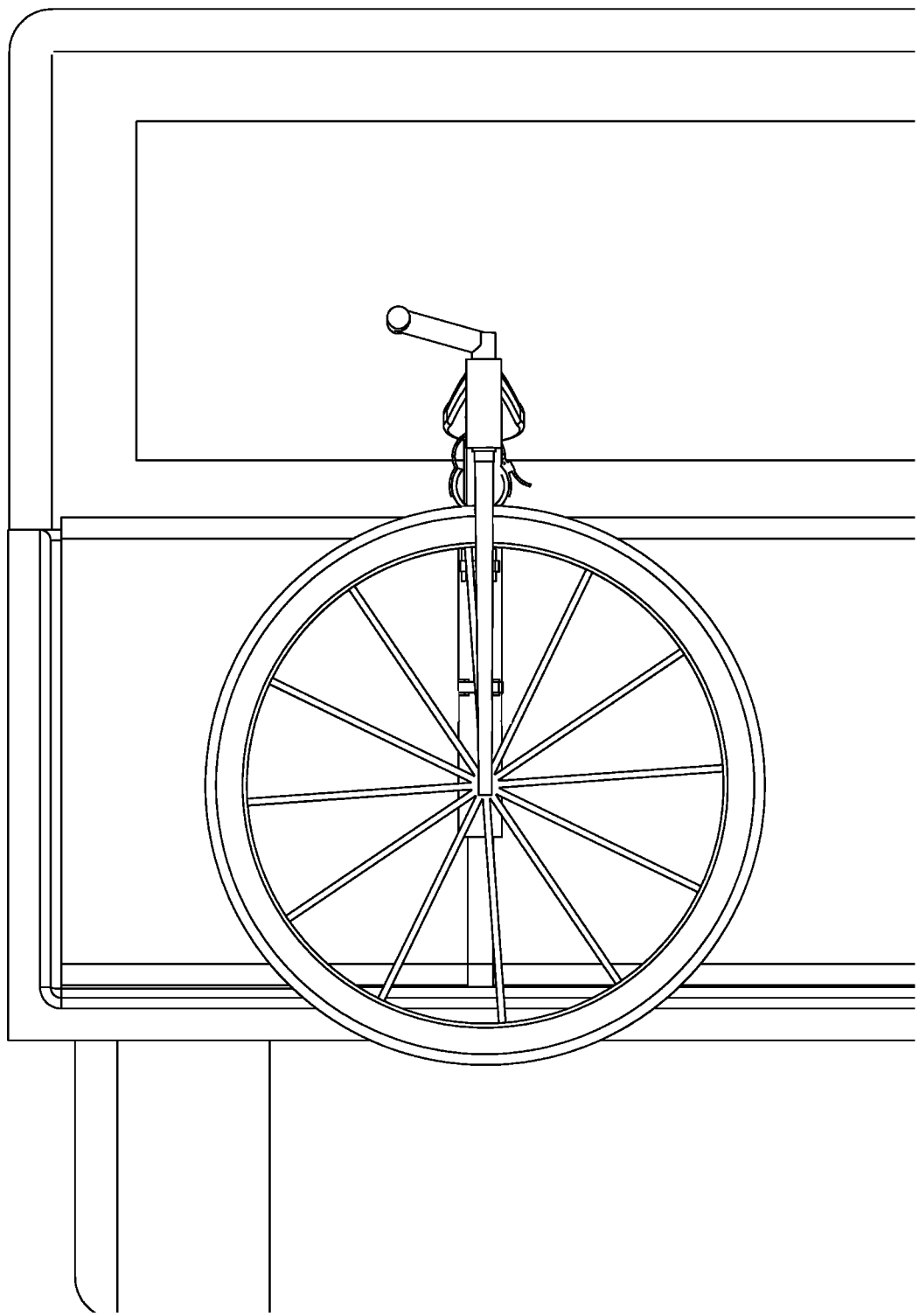
FIG. 3 shows a planar view from the rear of a truck having the bicycle mounting device installed on a truck tailgate and having a bicycle mounted there on, according to one embodiment of the invention.

In one exemplary implementation of the embodiment shown in FIG. 1A, the buckles, loops and Velcro secure the bicycle mounting device to the truck tailgate (see FIGS. 2-4). The hook and pile allow the length of the base strap to be adjusted to the ideal length of the truck tailgate. Padding is provided to protect the bicycle and the tailgate from scratching when the bicycle is secured to the truck tailgate. FIG. 1A further shows a buckle disposed to tighten and secure the opposite strap with hook and pile materials. To secure the opposite strap it must be thread through the buckle and secured with the hook and pile materials. The two padded straps are attached to the main padded strap that goes around the entire tailgate and is also secured with the hook and pile materials. The bicycle is then placed over the tailgate and secured by attaching one of the padded straps attach to the main padded strap around the down tube. Next the padded strap that attaches to the fork arm of the bicycle for securing. Once the bicycle is secured and anchored to the tailgate the bicycle can be transported.

The top transverse strap that attaches to the down tube is padded to incur the angle of the down tube and to prevent damage to the bicycle or the tailgate. It also is angled and padded with cushioning to allow for the accommodation of different shapes and components of the down tube.

In one embodiment, the bottom strap can be repositioned through an option to place the strap in between the hook and pile of the main padded strap this allows the strap placed on an area of the fork of the bicycle that would not interfere with securing it. Proper placement of the strap is dependent upon the height of the fork and size of the bicycle so that it does not interfere with securing the fork to the strap when it is secured by velcro.

Figure 7A:
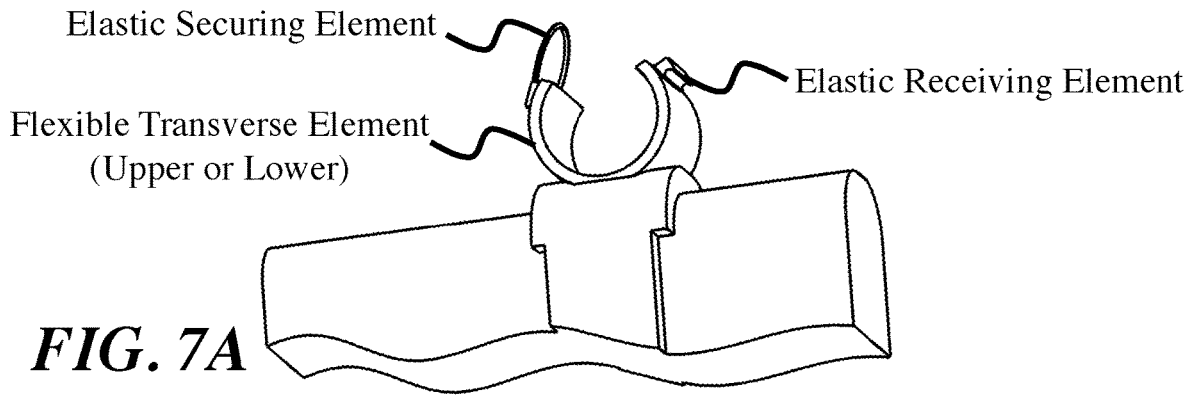
FIGS. 7A-7F show exemplary securing elements for the top securing element or bottom securing element, where
Figure 7B:
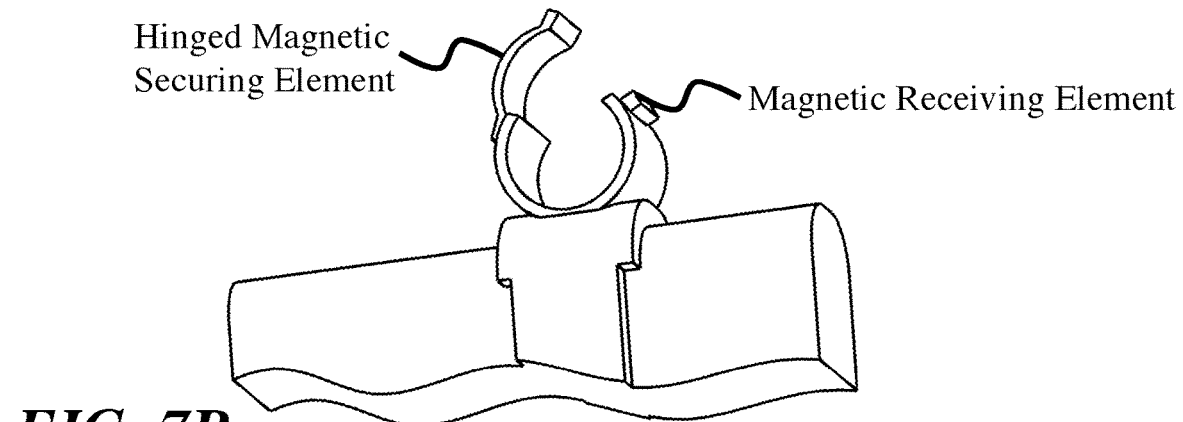
Figure 7C:
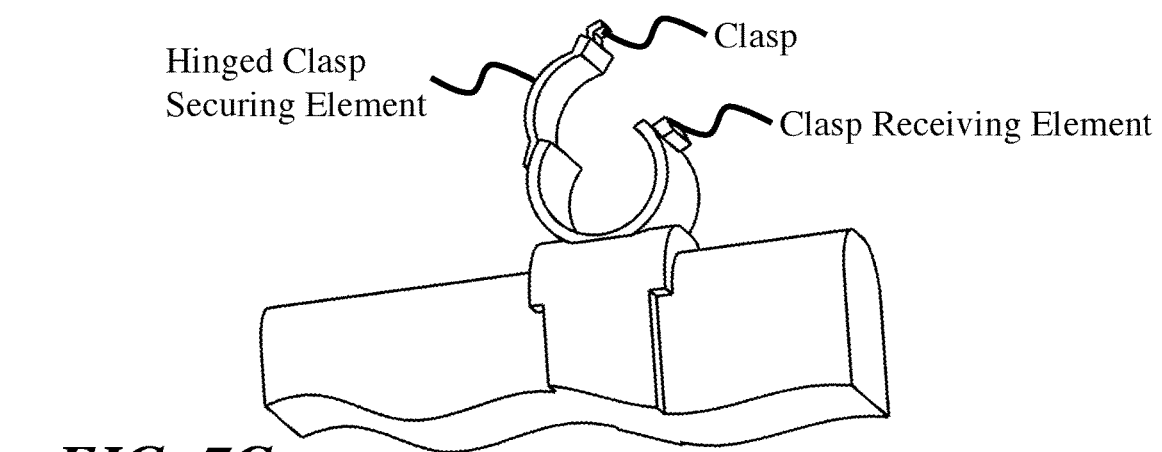
Figure 7D:
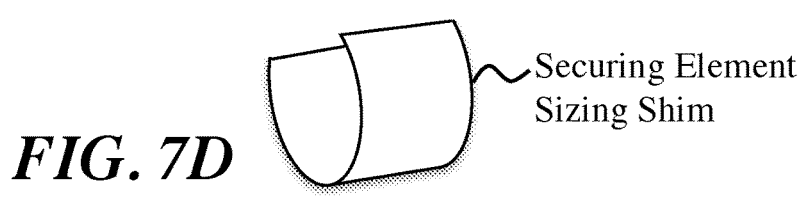

FIGS. 7A-7F show exemplary securing elements, wherein it is understood that these figures represent applications as a top securing element or a bottom securing element, where FIG. 7D shows a securing element sizing shim, where the sizing shim is configurable for different bicycle down tube and fork diameters. Regarding the securing elements, the base strap securing element, the top connection element and the at least one lower connection element can include hook and pile, male to female connectors, buckle, friction loop, button and hole, press snap, ratchet connection, boa dial, quick release, a magnetic lock, a C-shape socket, mechanical hinged push button release, and a push button quick release (see FIGS. 1A and 6D). Here, the push button release can include a Velcro™ latch-rubberized clamp with a Velcro™ closure, a rubber latch-rubberized clamp with rubber latch that attaches to a pin (see FIG. 7A), a push button quick release having positive and negative (male/female) receptacles using a quick release button which includes depressible quick release buttons from either piece to remove the fork from the base strap (see FIG. 1A), or a Velcro™ rap is attached around the fork to secure the strap, and a quick release button that is attached to the base strap through the molly.

In another embodiment, the push button quick release, such as a FidLock™ having a magnetic option that helps draw the two ends to closer for connection (see FIG. A).

Figure 7E:
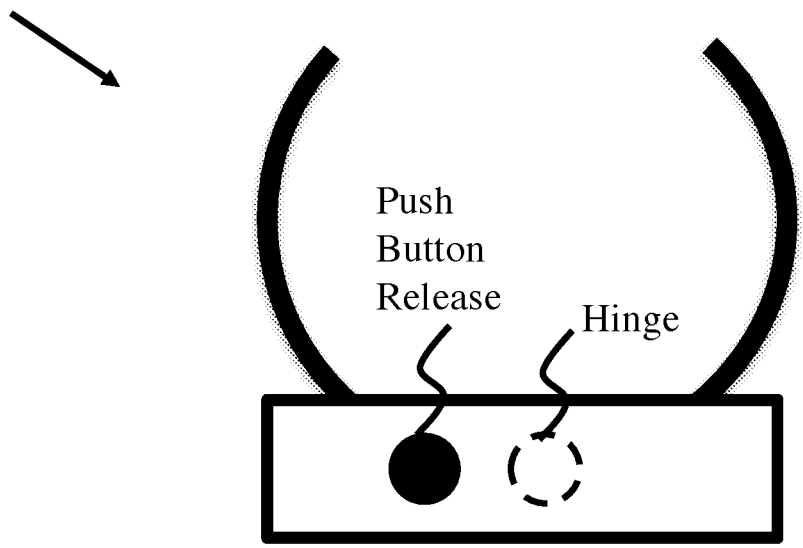
Figure 7F:
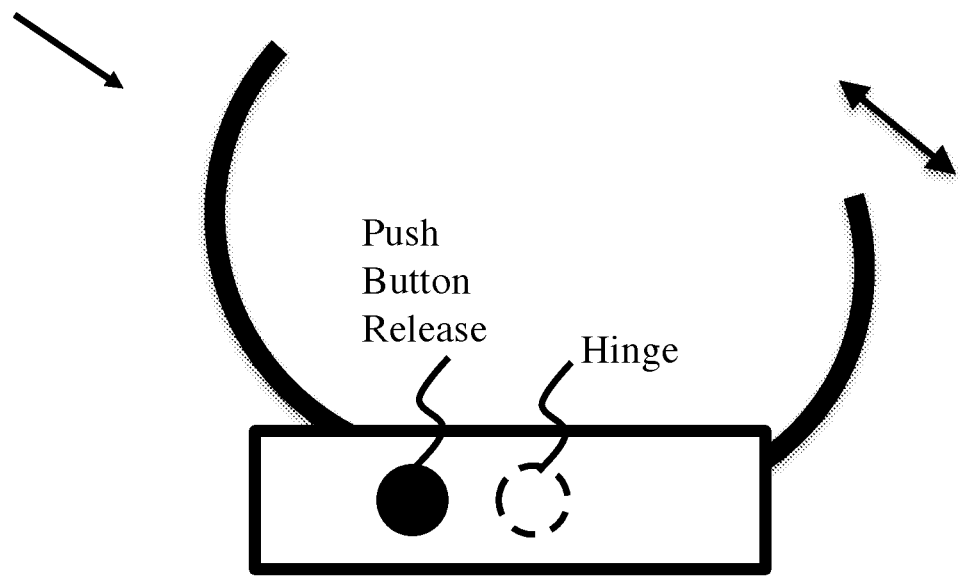

The securing element can further include a quick release backpack buckle, or a mechanical clasp with quick release button (see FIGS. 7E-7F).

In one aspect, the C-shape socket further includes a closing element configured to detachably span across an open end of the C-shape socket to selectively close the C-shape socket.

The present invention has now been described in accordance with several exemplary embodiments, which are intended to be illustrative in all aspects, rather than restrictive. Thus, the present invention is capable of many variations in detailed implementation, which may be derived from the description contained herein by a person of ordinary skill in the art. All such variations are considered to be within the scope and spirit of the present invention as defined by the following claims and their legal equivalents.

What is claimed:

1. A bicycle mounting device, comprising:
   a) a base strap comprising a base strap first end and a base strap second end, wherein said base strap first end is detachably connected to said base strap second end by an adjustable length connector to form a loop-shape base strap;
   b) an upper connection element, wherein said upper connection element is dimensioned to detachably connect a bicycle frame down tube to said base strap; and
   c) at least one lower connection element, wherein said at least one lower connection element is disposed below said upper connection element, wherein said at least one lower connection element is dimensioned to detachably connect a bicycle fork arm tube to said base strap.

2. The bicycle mounting device of claim 1, wherein said base strap further comprises a flexible protective core along said base strap, wherein said flexible protective core and said base strap are dimensioned to form a security strap, wherein said security strap comprises:
   a) a flexible splice-resistant material; and
   b) a first locking element disposed on a first end of said security strap, and a second locking element disposed on a second end of said security strap, wherein said first locking element is dimensioned to engage said second locking element to lock said security strap in said loop-shape.

3. The bicycle mounting device of claim 2, wherein said upper connection element comprises a splice-resistant material and a locking element that is dimensioned to lock said bicycle mounting device about said bicycle frame down tube.

4. The bicycle mounting device of claim 1, wherein said base strap securing element, said top connection element and said at least one lower connection element is selected from the group consisting of hook and pile, male to female connectors, buckle, friction loop, button and hole, press snap, ratchet connection, boa dial, quick release, a magnetic lock, a C-shape socket, mechanical hinged push button release, and a push button release.

5. The bicycle mounting device of claim 4, wherein said C-shape socket further comprises a closing element configured to detachably span across an open end of said C-shape socket to selectively close said C-shape socket.

6. The bicycle mounting device of claim 1, wherein said top securing element comprises a top C-shape socket, wherein said top C-shape socket comprises a top closing element configured to detachably span across an open end of said top C-shape socket to selectively close said top C-shape socket.

7. The bicycle mounting device of claim 1, wherein a bottom surface of said base strap comprises a tactile polymer feature disposed to limit slipping between said bicycle mounting device and a truck tailgate.

8. The bicycle mounting device of claim 1, wherein said at least one lower connection element is moveably attached to said base strap, wherein one or more said moveably attached lower connection elements are configured in a daisy chain along said base strap.

9. The bicycle mounting device of claim 1, wherein said base strap comprises a padded bottom surface, a flexible protective core, and a durable fabric top surface.

10. The bicycle mounting device of claim 1, wherein said at least one lower connection element is slidably connected along said base strap.

* * * * *